Jan. 10, 1928.

A. V. SULLIVAN 1,655,581

FISH CUTTING MACHINE

Filed March 9, 1927

INVENTOR.
ALBERT V. SULLIVAN

BY
Townsend Loftus & Abbett
ATTORNEYS.

Jan. 10, 1928.

A. V. SULLIVAN 1,655,581

FISH CUTTING MACHINE

Filed March 9, 1927    3 Sheets-Sheet 2

INVENTOR.
ALBERT V. SULLIVAN
BY
ATTORNEYS.

Jan. 10, 1928.

A. V. SULLIVAN 1,655,581

FISH CUTTING MACHINE

Filed March 9, 1927

INVENTOR.
ALBERT V. SULLIVAN
BY
ATTORNEYS.

Patented Jan. 10, 1928.

1,655,581

UNITED STATES PATENT OFFICE.

ALBERT V. SULLIVAN, OF ALAMEDA, CALIFORNIA.

FISH-CUTTING MACHINE.

Application filed March 9, 1927. Serial No. 173,802.

This invention relates to fish cutting machines and particularly pertains to machines of the type disclosed in United States Letters Patent #1,525,699, issued to me February 10, 1925.

The machine disclosed in the patent referred to was primarily designed for the purpose of rapid cutting of salmon into can lengths and feeding the lengths to a conveyor or delivery belt in such a manner that they would be delivered to a can filling machine. The machine is so designed that the cut portions of the fish will be delivered uniformly to the can filler in such a position that they would be properly packed within the can, eliminating the likelihood of "cross-pack" and uneven filling of the cans.

It is the principal object of the present invention to generally improve the construction and operation of machines of the character referred to.

In carrying out this object into practice, I provide a frame supporting a table upon which fish are delivered at timed intervals and engaged by a carriage which feeds them to a cutting mechanism, where the fish is cut into portions of a predetermined length. These portions are then fed by the carriage to an intermittently operated conveyor which disposes them one by one at a point of discharge. At this point the cut portions are transferred automatically to a delivery belt or conveyor which conveys them to the can filling machine in proper positions, so that they will be inserted into a can endwise.

One form which the invention may assume is exemplified in the following description and illustrated by way of example in the accompanying drawings, in which.

Referring more particularly to the accompanying drawings, 10 indicates a rigid frame of suitable design and construction for supporting the various operating elements of the machine. For the purpose of assisting in clearly setting forth the construction and operation of the machine, in Fig. 1 I have designated opposite ends of the machine as A and B, A being the feed end of the machine and B the delivery end.

Figure 1:
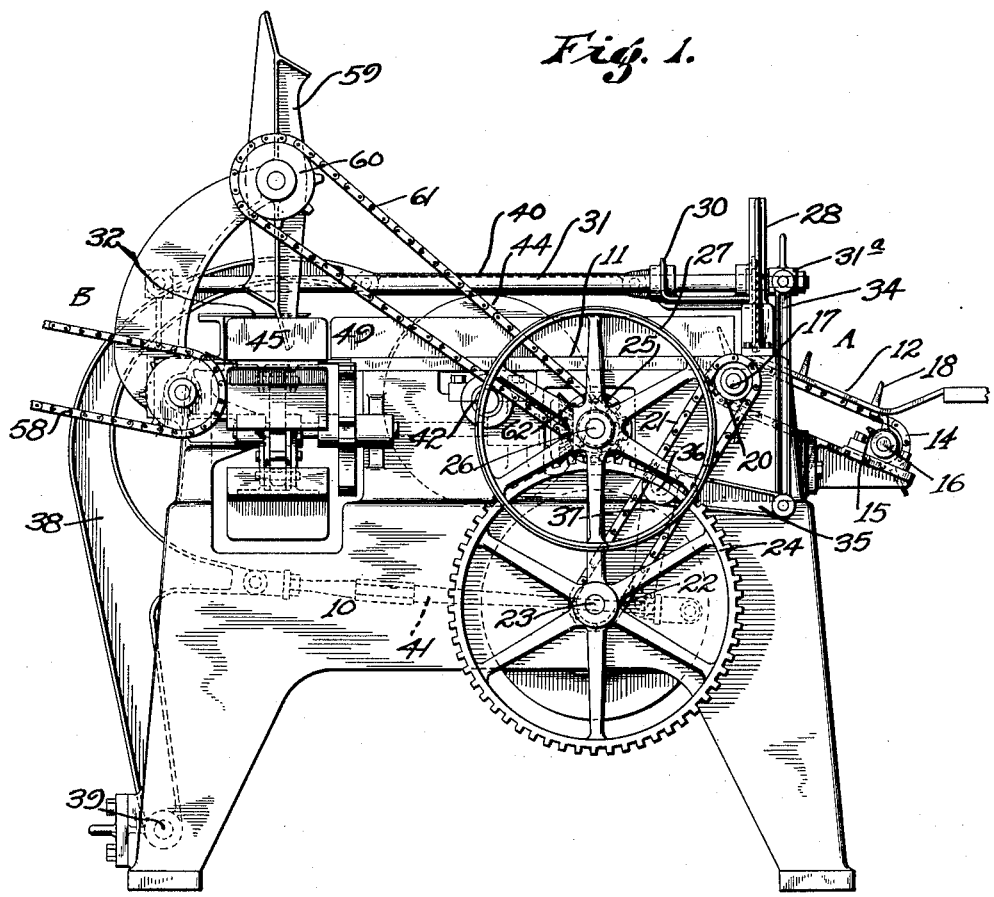
Fig. 1 is a side elevation of a machine embodying the preferred form of my invention.
Figure 5:
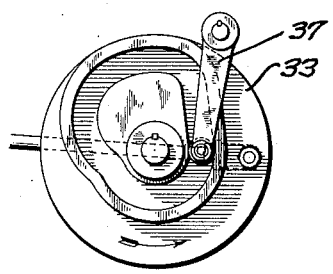
Fig. 5 is a fragmentary view of the cam mechanism which operates the feed carriage.
Figure 2:
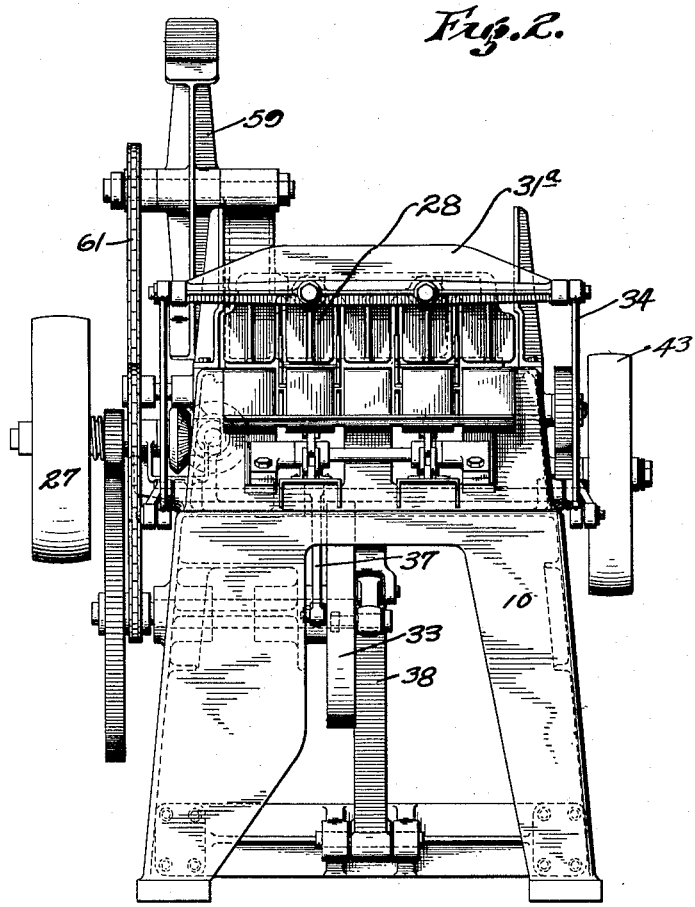
Fig. 2 is an end elevation of the feed end of the machine.
Figure 4:
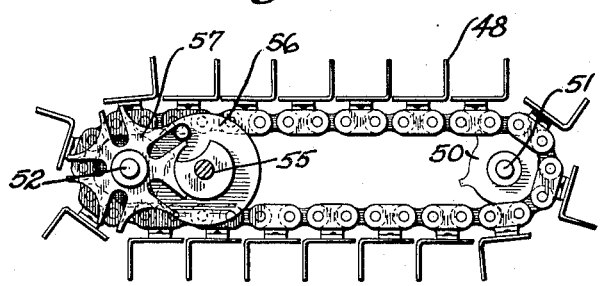
Fig. 4 is a view in side elevation of the intermittently operating conveyor which delivers the fish from the cutters to the transfer mechanism so that they may be conveyed from the machine.
Figure 3:
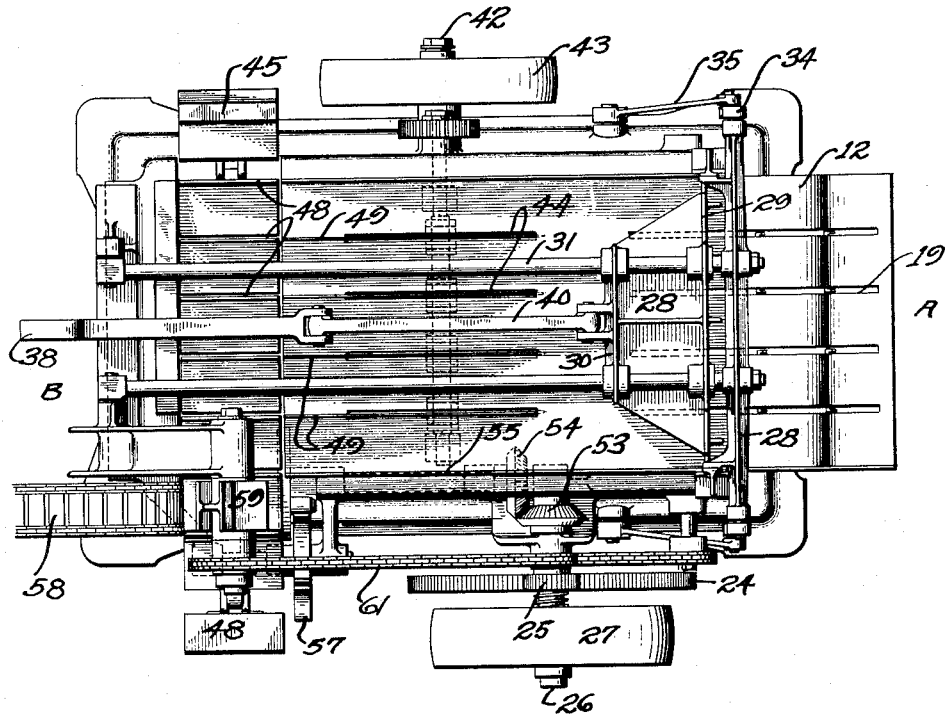
Fig. 3 is a plan view of the machine.

Reference being had to Fig. 1, it is seen that the top of the frame is fitted with a table 11 having a horizontally disposed plane surface over which the fish fed to the machine may be moved through various operations. Adjoining this table 11 at the feed end A of the machine is an inclined apron 12 to which the fish is delivered. Beneath this apron and disposed parallel thereto is a pair of endless chains 14 arranged over sprockets 15. These sprockets 15 are secured on shafts 16 and 17 which are arranged transversely of the machine and journaled in suitable bearings carried by the frame thereof.

The endless chains 14 each carry a plurality of spaced lugs 18 which project and travel through grooves 19 in the apron 12 and table 11 to engage a fish arranged transversely of the apron and elevate it to the table 11. The fish when elevated to and disposed on the table will be disengaged by the lugs 18 and will lie transversely of the machine, in which position it will be fed through the machine.

The endless chains 14 carrying the lugs 18 are driven in timed relation to other operating parts of the machine, the drive being shown in Fig. 1, reference to which figure will disclose the shaft 17 as being fitted with a sprocket 20 over which a chain 21 is led, which chain is also arranged on a sprocket 22 secured on a countershaft 23. This countershaft 23 is fitted with a large spur gear 24 in mesh with a pinion 25 secured on a drive shaft 26. This drive shaft 26 is fitted with a suitable drive pulley 27 fitted with the usual clutch mechanism. It is obvious that the driving pulley 27 on the drive shaft 26 may be driven from any suitable source.

Disposed transversely of the machine and table 11 is a feed carriage 28. This feed carriage 28 is best shown in Fig. 1 where it is seen that it comprises a rake portion 29 having bearings 30 guided on a pair of longitudinal guide rods 31 secured at their ends in a pivotal yoke carried by the main frame 10. The guide rods 31 are disposed a distance above the table as illustrated.

The feed carriage is adapted to reciprocate longitudinally of the table and to be elevated upon its return stroke to the feed end of the machine to permit fish to be deposited on the table and then to be lowered and engage the fish and feed it toward the delivery end of the machine. For this reason the pivotal yoke at the delivery end of the machine, within which the guide rods 31 are secured, is pivoted to the frame at the delivery end of the machine. At their other ends the guide rods 31 are secured in a yoke 31$^a$ guided for vertical movement at the feed end of the machine. This yoke 31$^a$ is connected with a pair of vertically disposed arms 34 arranged at the sides of the machine which are connected to crank arms 35 secured on a cross shaft 36.

A cam arm 37 is also secured at one end on this shaft 36. This cam arm is fitted with a roller at one end which engages the groove in the cam 33. The formation of the groove in this cam is such that the connecting mechanism will be operated at proper intervals to elevate the feed end of the guide rods 31. It should be stated that the feed carriage is elevated when it reaches the feed end of the machine so that the fish may be delivered from the apron 12 to the table 11. After the fish has been delivered to the table 11, the feed carriage lowers behind the fish and is advanced toward the delivery end of the machine to feed the fish through the various operations. It will be noticed that the fish will be held against the table 11 by the horizontal portion of the rake while it is advanced toward the delivery end of the machine by the vertical portion of the rake.

To reciprocate the feed carriage it is connected to an oscillating arm 38 which is pivoted to the frame as at 39. The connection between the feed carriage and the arm being a connecting rod 40 which is pivoted at one end to the feed carriage and at the other end to the arm 38.

To operate the arm 38 it is connected by means of a pitman 41 to an eccentric point on the cam disk 33, the stroke of the pitman 41 being sufficient to reciprocate the feed gate a proper amount at the proper intervals.

Intermediate the feed and delivery ends of the machine is a cutter shaft 42. This shaft is mounted horizontally and transversely of the machine just beneath the table 11, suitable bearings being provided on the frame for the reception of this shaft. This cutter shaft 42 extends outwardly beyond one side of the frame 10 and is fitted with a pulley 43 which may be engaged by a suitable belt to drive the shaft at the proper rate of speed. Secured on the shaft 42 at spaced distances therealong are a plurality of cutter disks 44. The spacing between these disks is equal to the length of the fish it is desired to insert in a can, so that after the fish passes through the cutters it will be cut to can length.

It will be noticed that it has been illustrated and described that the cutters have been provided with a drive separate from the drive of the remaining portion of the machine. This is particularly important because in repairing the machine the cutters may be held stationary while the remaining parts of the machine may be operated for adjustments and repairs. Also when sharpening the cutters, the main operating parts of the machine may be held in a stationary position while the cutters are revolved and sharpened.

It will be noticed from the drawings that the feed carriage is slotted so that it may pass the cutter disks 44 and convey the fish therethrough. As the fish passes the cutters 44, it will be cut to can length and these lengths will be held in alignment and delivered to a transverse conveyor 45. This conveyor is formed into compartments of dimensions to receive the cut lengths of fish and maintain them separated. The distance between the partitions 48 forming the compartments on the conveyor 45 are spaced apart the same distance as the cutter blades 44. Intermediate the cutter blades and the partitions on the conveyor 45 are separators 49. These separators are vertically disposed plates bridging the distance between the cutter disks and the partitions on the conveyor 45 and are rigidly held on the table 11. These separators are very important inasmuch a they keep the cut ends of the fish sections separated. It should be stated that if the cut ends of the fish become in contact they adhere together, rendering it very difficult to again separate them and have them fed properly to the conveyor.

The conveyor 45, as previously described and as illustrated in the drawings, is arranged transversely of the machine in alignment with the cutter disks 44, the conveyor being driven by sprocket wheels 50 arranged on shafts 51 and 52 supported by the frame 10. For driving these sprockets I provide a bevel gear 53 secured on the drive shaft 26 which meshes with a bevel gear 54 secured on a shaft 55 also journaled in the frame 10.

The shafts 55 and 52 are fitted with Geneva wheels 56 and 57 which cooperate to intermittently drive the conveyor 45 in synchronism with the operation of other parts of the machine. That is to say, the feed carriage after being lowered travels toward the delivery end of the machine, feeding the fish through the cutters 44 which cut the fish into lengths and then feed the cut portions of the fish to the conveyor 45. As the conveyor operates step by step, it delivers the cut portions of the fish one by one to a discharge point. At this point the cut portions are transferred one by one from the conveyor 45 to a discharge conveyor 58 extending between the machine here disclosed and a can filling machine.

To transfer the fish from the conveyor 45 to the conveyor 58, a transfer member 59 is provided. This arm revolves in a plane parallel to the longitudinal axis of the machine and is arranged above the machine as disclosed in Fig. 1. The shaft of this delivery arm is fitted with a sprocket 60 connected by a chain 61 to a sprocket 62 on the drive shaft 26. This arm is driven at such a speed that its operation synchronizes with the operation of the conveyor 45. That is to say, the conveyor 45 is advanced step by step due to the provision of the Geneva movement and successively and intermittently disposes the cut portions of the fish in alignment with the transfer arm 59 and the conveyor 58. At this point one end of the arm passes through the aligned compartment on the conveyor 45 and transfers the cut portion of the fish therein to the conveyor 58. As the arm moves out of the compartment, the conveyor 45 advances a second step and aligns a second compartment with the transfer arm 59 so that the other end of the latter will function and transfer the fish to the conveyor 58.

It should be stated here that the portions of the fish delivered from the cutters are delivered to the conveyor 45 in the same position. As the conveyor 58 extends at right angles to the conveyor 45 the transfer arm 59 will dispose the cut portions of the fish transversely of the conveyor 58 in proper position for correct delivery to the can filling machine. It should be stated that this is a very important feature of the present invention inasmuch as it is necessary to place the fish in the can longitudinally and avoid cross packing in the can. That is to say, the cut ends of the fish must always be exposed at the ends of the can, otherwise the can is termed what is known as a "cross-pack" and is an inferior product.

In operation of the device, a drive is transmitted to the drive shaft 26 and to the cutter shaft 42, placing the various elements of the machine in operation. The fish which have been cleaned are laid transversely on the inclined apron 12 one by one. As the lugs 18 carried by the endless chains 14 project through the slots 19 in the apron 12, they engage the fish and elevate it upwardly along the apron and deposit it on the table 11. As shown in the drawings the endless chains 14 are in longitudinal alignment with the cutters 44 so that the lugs 18 thereon will pass through the slots in the carriage. Thus, as the carriage is lowered just as the fish is placed on the table 11, it will move toward the delivery end of the machine, disengaging the fish from the lugs 18 so that the latter will not pinch the fish against the table 11 as they descend.

As stated, the cam operating the carriage 28 is so timed as to lower the vertical portion of the carriage just behind the fish. As the carriage is lowered the arm 38 is swung, drawing the carriage along the table toward the delivery end of the machine. As the carriage moves forwardly it places the fish into contact with the cutting disks 44 which sever the fish into can lengths. These cut portions of the fish are maintained separated after passing between the cutter disks 44 by the separators 49.

During this time the delivery conveyor 45 has been placed in intermittent operation, each step of the operation advancing the compartments therein one space or the distance equal to the distance between the cutter blades and the separators 49. During the stationary or idle moment of the conveyor 45, the carriage delivers the cut portions of fish to the compartments therein. At this point the carriage has reached the end of its stroke and is returned for a successive operation. Upon its return stroke the cam 33 actuates the arm 35 and the vertical arms 34, elevating the feed end of the guide rods 31. Such elevation of the rods 31 elevates the carriage so that it will be in a position to engage a second fish delivered to the table 11.

Reference being had to Fig. 1 it will be seen that a scraper blade 32 is arranged transversely of the machine and just over the partitions on the delivery conveyor 45. It is intended that the horizontal portion of the carriage rack pass over this scraper blade 32 so that the latter will disengage the fish from the carriage.

At the delivery end of the machine the delivery conveyor 45 will operate step by step due to the provision of the Geneva movement and will successively dispose its compartments in alignment with the end of the conveyor 58. As each compartment is disposed in this position, the transfer arm 59, which is continuously revolved, will transfer the fish from the compartment on the conveyor 45 to the conveyor 58. The timing of the conveyor 45 and the arm 59 is such that the ends of the arm will pass through each compartment as it is brought into discharge position. The conveyor 45 operates intermittently as described, advancing step by step until all the fish thereon is discharged.

It has been described before that the distance of advance of the conveyor 45 at each step is equal to the spacing between the cutting disks 44, so that at each rest period of the conveyor the partition walls thereon will be in alignment with the separators 49 and the disks 44.

The time period necessary for the carriage to make a complete stroke and return is sufficient to allow the conveyor 45 to completely discharge one charge of fish. These portions of fish in the conveyor will be disposed endwise on the conveyor 45 and will be transferred in the same position to the conveyor 58, so that they will be delivered to the can filling machine in proper position and be inserted endwise into a can.

From the foregoing it is obvious that I have provided a machine which is fully automatic in operation and which will operate certainly and positively to cut fish into can lengths and deliver the cut portions in predetermined positions for discharge. In all of these operations the fish is handled mechanically and does not touch the human hand. This feature from a sanitary point of view is one of considerable importance, also it eliminates any likelihood of accidents to the operators of the machine and speeds up the cutting and delivery of fish considerably.

As before described, the cutting disks 44 are driven by a drive entirely separate from the driving mechanism of the remainder of the operating parts of the machine. This is quite a feature inasmuch as when cleaning, adjusting and repairing the machine it is necessary for safety purposes that the cutter blades be not in operation. Therefore, when performing these various functions the cutter blades may be held stationary while the remainder of the machine is placed in operation. Thus, any necessary cleansing, adjusting or repairing operations may be attended to without any danger of becoming in contact with any of the revolving cutter blades. Also it is found necessary to frequently sharpen the cutter blades 44. Thus, the drive to the main portions of the machine may be discontinued and the blades driven while applying a sharpening medium thereto. Thus, the sharpening of the blades may be effected quickly and easily without disconnecting and removing any parts of the machine.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. A machine of the character described comprising a table upon which a fish may be disposed in a transverse position, a feeding carriage adapted to engage the fish delivered to the table and carry them along the table, cutting means interposed in the path of the carriage to cut the fish into portions of a predetermined length, a transversely arranged endless conveyor operated to advance intermittently in one direction and to which the cut portions of the fish are delivered by the carriage, transfer means operating in synchronism with the conveyor and adapted to discharge portions of fish therefrom one by one.

2. A machine of the character described comprising a table upon which a fish may be disposed in a transverse position, a feeding carriage adapted to engage the fish delivered to the table and carry them along the table, cutting means interposed in the path of the carriage to cut the fish into portions of a predetermined length, a transversely arranged endless conveyor operated to advance intermittently in one direction and to which the cut portions of the fish are delivered by the carriage, transfer means operating in synchronism with the conveyor and adapted to discharge portions of fish therefrom one by one, driving means for operating the feed carriage, the conveyor and the transfer means in timed relation.

3. A machine of the character described comprising a table upon which a fish may be disposed in a transverse position, a feeding carriage adapted to engage a fish disposed on the table and feed it along the table, rotary cutters spaced apart transversely of the table in the path of the carriage to cut the fish into portions of a predetermined length, a transversely arranged endless conveyor operating intermittently and in one direction only and to which the cut portions of the fish are delivered from the cutters by the carriage, a discharge conveyor, transfer means operating in synchronism with the intermittently operated conveyor and adapted to transfer the portions of fish therefrom to the delivery conveyor one by one.

4. A machine of the character described comprising a table upon which a fish may be disposed in a transverse position, a feeding carriage adapted to engage a fish disposed on the table and feed it along the table, rotary cutters spaced apart transversely of the table in the path of the carriage to cut the fish into portions of a predetermined length, a transversely arranged endless conveyor operating intermittently and in one direction only and to which the cut portions of the fish are delivered from the cutters by the carriage, a discharge conveyor, transfer means operating in synchronism with the intermittently operated conveyor and adapted to transfer the portions of fish therefrom to the delivery conveyor one by one, driving means for driving the carriage, the transversely arranged conveyor and the transfer means in synchronism, and a separate drive for the cutters.

5. A machine of the character described comprising a table upon which a fish may be disposed transversely, a feeding carriage adapted to engage the fish disposed on the table and feed it along the table, a plurality of vertically arranged cutters spaced apart transversely of the table in the path of the feeding carriage and adapted to cut the fish into portions of a predetermined length, a transversely arranged endless conveyor having its upper surface lying in the same plane as the top of the table, means for intermittently driving said conveyor in one direction only, compartments formed in the conveyor of the same length as the space between the cutters with which they align when the conveyor is stationary whereby the feeding carriage will deliver the portions of fish from the cutters to the compartments, transfer means operated synchronously with the conveyor to discharge the cut portions of fish from the compartments one by one.

6. A machine of the character described comprising a horizontally disposed table, means for delivering fish in a transverse position to the table at timed intervals, a feeding carriage adapted to engage the fish delivered to the table and carry them along the table, a plurality of rotary cutters spaced apart transversely of the table and interposed in the path of the carriage to cut the fish into portions of a predetermined length, a transversely arranged endless conveyor having its upper flight disposed in the same plane as the table and upon which the cut portions of the fish are delivered from the cutters by the feeding carriage, transfer means adapted to discharge the cut portions of fish from the conveyor as they reach a discharge point, driving means for driving the feeding carriage, the conveyor and the transfer means in synchronism.

7. A machine of the character described comprising a horizontally disposed table, delivery means for delivering fish in a transverse position to the table at timed intervals, a feeding carriage adapted to engage the fish delivered to the table and feed it along the table, a plurality of rotary cutters spaced apart transversely of the table in the path of the carriage to cut the fish fed thereby into portions of a predetermined length, a transversely arranged endless conveyor operated in one direction intermittently, the upper flight of said conveyor being disposed in the same plane as the table, vertical partitions on the conveyor dividing the same into compartments of the same length as the spaces between the cutters with which they align when the conveyor is stationary whereby the cut portions of the fish will be delivered from the cutters to the compartments, a discharge conveyor, transfer means for transferring the portions of fish from the compartments to the discharge conveyor, driving means for driving the delivery means, the feeding carriage, the intermittently operated conveyor and the transfer means in synchronism.

8. A machine of the character described comprising a horizontally disposed table, delivery means for delivering fish in a transverse position to the table at timed intervals, a feeding carriage adapted to engage the fish delivered to the table and feed it along the table, a plurality of rotary cutters spaced apart transversely of the table in the path of the carriage to cut the fish fed thereby into portions of a predetermined length, a transversely arranged endless conveyor operated in one direction intermittently, the upper flight of said conveyor being disposed in the same plane as the table, vertical partitions on the conveyor dividing the same into compartments of the same length as the spaces between the cutters with which they align when the conveyor is stationary whereby the cut portions of the fish will be delivered from the cutters to the compartments, a discharge conveyor, transfer means for transferring the portions of fish from the compartments to the discharge conveyor, driving means for driving the delivery means, the feeding carriage, the intermittently operated conveyor and the tranfer means in synchronism, and a separate drive for the rotary cutters.

9. A machine of the character described comprising a horizontally disposed table, delivery means for delivering the fish in a transverse position to the table, a reciprocable feed carriage operating longitudinally of the table, said feed carriage being adapted to engage the fish delivered to the table and to feed the same along the table, a plurality of rotary cutters spaced apart transversely of the table in the path of the carriage to cut the fish into portions of a predetermined length, an endless conveyor arranged transversely of the table in a position to receive the cut portions of the fish as they emerge from between the cutters, vertical partitions arranged on the conveyor and spaced apart the same distance as the cutters with which they align when the conveyor is stationary, means for intermittently advancing the conveyor a distance equal to the spacing between the cutters whereby to dispose the cut portions of fish one by one at a transfer point, a discharge conveyor arranged adjacent the transfer point, a transfer member operated in synchronism with the intermittently operated conveyor to transfer the fish therefrom to the discharge conveyor, driving means for driving the delivery means, the feeding carriage, the intermittently operated conveyor and the transfer member in synchronism.

10. A machine of the character described comprising a horizontally disposed table, a reciprocable feeding carriage arranged thereabove and adapted to reciprocate longitudinally of the table, delivery means for receiving a fish and delivering the same one by one at timed intervals to the table at one end of the stroke of the feeding carriage, means for maintaining the feed carriage in a position unobstructing the delivery of the fish to the table and for placing the same into engagement with the fish after the latter has been delivered to the table whereby longitudinal movement of the feeding carriage will feed the fish along the table, a plurality of rotary cutters spaced apart transversely of the table in the path of the feed carriage to engage the fish and cut the same into portions of a predetermined length, a conveyor arranged transversely of the table with its upper flight in the same plane as the table and to which the cut portions of the fish are delivered from the cutters by the carriage, vertical partitions arranged on the conveyor and spaced apart the same distance as the cutters with which they align when the conveyor is stationary, separators on the table bridging the spacing between the cutters and the partitions on the conveyor to maintain the cut portions of the fish separated as they are delivered from the cutters to the conveyor, means for intermittently advancing the conveyor a distance equal to the spacing between the cutters whereby to dispose the cut portions one by one at a transfer point, a discharge conveyor arranged adjacent the transfer point, a transfer member operating in synchronism with the intermittently operated conveyor to transfer the cut portions of fish therefrom to the discharge conveyor, and driving means for driving the delivery means, the feeding carriage, the intermittently operated conveyor and the transfer member in synchronism.

ALBERT V. SULLIVAN.